United States Patent
Fang et al.

(10) Patent No.: US 7,820,051 B2
(45) Date of Patent: Oct. 26, 2010

(54) RECYCLING OF ELECTROCHEMICAL-MECHANICAL PLANARIZATION (ECMP) SLURRIES/ELECTROLYTES

(75) Inventors: Rui Fang, Fishkill, NY (US); Deepak Kulkarni, Wappingers Falls, NY (US); David K. Watts, Hopewell Junction, NY (US)

(73) Assignee: International Business Machines Corporation, Armonk, NY (US)

(*) Notice: Subject to any disclaimer, the term of this patent is extended or adjusted under 35 U.S.C. 154(b) by 735 days.

(21) Appl. No.: 11/678,089

(22) Filed: Feb. 23, 2007

(65) Prior Publication Data

US 2008/0233724 A1    Sep. 25, 2008

(51) Int. Cl.
*B01D 11/00* (2006.01)
(52) U.S. Cl. .............. 210/639; 204/571; 210/634; 210/663; 210/669; 210/787; 210/806; 210/805; 439/691; 439/692; 439/693; 451/36; 451/60; 451/446
(58) Field of Classification Search .............. 210/660, 210/663, 669, 670, 673, 677, 767, 787, 805, 210/806, 167.01, 167.31, 259, 263, 266, 210/335, 512.1, 683, 684, 688, 634, 638, 210/639; 438/690–693, 584; 451/36, 41, 451/60, 65, 87, 88, 446; 204/224, 224 M, 204/554, 571, 600, 660, 665, 666; 205/640, 205/656, 674, 80, 86, 98
See application file for complete search history.

(56) References Cited

U.S. PATENT DOCUMENTS

| | | | | |
|---|---|---|---|---|
| 3,582,290 | A * | 6/1971 | Grinstead | 423/6 |
| 4,215,009 | A * | 7/1980 | Spaziante et al. | 252/184 |
| 4,664,808 | A * | 5/1987 | Kim | 210/638 |
| 5,664,990 | A * | 9/1997 | Adams et al. | 451/60 |
| 5,770,085 | A * | 6/1998 | Wai et al. | 210/638 |
| 6,106,728 | A | 8/2000 | Iida et al. | |
| 6,267,644 | B1 * | 7/2001 | Molnar | 451/41 |
| 6,346,195 | B1 * | 2/2002 | Filson et al. | 210/668 |
| 6,390,890 | B1 * | 5/2002 | Molnar | 451/41 |
| 6,482,325 | B1 * | 11/2002 | Corlett et al. | 210/662 |
| 6,641,463 | B1 * | 11/2003 | Molnar | 451/41 |
| 6,866,784 | B2 | 3/2005 | Chang et al. | |
| 7,059,943 | B2 * | 6/2006 | Cann et al. | 451/44 |
| 7,223,344 | B2 * | 5/2007 | Zavattari et al. | 210/634 |
| 2002/0111121 | A1 * | 8/2002 | Sun et al. | 451/41 |
| 2003/0116446 | A1 * | 6/2003 | Duboust et al. | 205/682 |
| 2004/0129636 | A1 * | 7/2004 | Monzyk et al. | 210/634 |

OTHER PUBLICATIONS http://people.clarkson.edu/~samoy/ECMP.htm, Chemical Mechanical Planarization (CMP) and Electrochemical Mechanical Planarization (ECMP), Dec. 13, 2006 p. 1-5.

* cited by examiner

*Primary Examiner*—Joseph W Drodge
(74) *Attorney, Agent, or Firm*—Ian MacKinnon; Roberts Mlotkowski Safran & Cole, P.C.

(57) ABSTRACT

A method, process and system for the recycling of electro-chemical-mechanical planarization slurries/electrolytes as they are used in the back end of line of the semiconductor wafer manufacturing process is disclosed. The method, process and system includes with the removal of metal ions from slurries using ion exchange media and/or electrochemical deposition.

18 Claims, 1 Drawing Sheet

RECYCLING OF ELECTROCHEMICAL-MECHANICAL PLANARIZATION (ECMP) SLURRIES/ELECTROLYTES

FIELD OF THE INVENTION

The present invention relates to methods, processes and systems for recycling of electrochemical-mechanical planarization (ECMP) slurries/electrolytes used in back end of line processes for semiconductor wafer manufacturing.

BACKGROUND OF THE INVENTION

In ECMP processes, fresh slurries/electrolytes ("slurry or slurries") are delivered to an ECMP tool for removing metals from wafers. This metal may be, for example, copper. This removal occurs either electrochemically, i.e., the wafer is under an oxidation potential for oxidizing solid metal at the surface to metal ions, which dissolve into the slurry, or by a abrasion, i.e., the slurry scrapes off small particles of the wafer metal into the slurry. In the latter case, particles are oxidized in the slurry medium. In both scenarios, the slurry becomes contaminated by the metal ions which were on the surface of the wafer.

As is known, ECMP is a costly process in semiconductor manufacturing. Most of these costs are attributed to consumables such as polishing pads and slurries. At present time, slurries are treated as a single use item, because once the slurry is contaminated with the metal ions, they cannot be used again for polishing or other ECMP processes.

The slurries comprise abrasives to smooth the surface of the semiconductor wafer, thereby removing parts of its surface. They further comprise corrosive chemicals, buffers and colloids to maintain the mixture in dispersion. The properties of these diverse ingredients relate directly to the quality of the finished product and are qualified in measurements such as the rate of removal of surface material, uniformity of removal, planarity of the polished surface, and defects present. However, due to the metal ion contamination, the quality of the slurry is severely compromised and, as such, it is not possible to maintain the quality of the finalized product using this contaminated slurry. Accordingly, the slurry is discarded, thus, significantly adding to the costs of the ECMP processes. That is new slurry must be introduced into the system in order to maintain the required quality necessary for ECMP processing.

Accordingly, there exists a need in the art to overcome the deficiencies and limitations described hereinabove.

SUMMARY OF THE INVENTION

In a first aspect, the present invention is directed to a method of reclaiming a slurry treatment. The method includes extracting metal ions from a slurry using an immiscible solvent to form a treated slurry for further use in an electrochemical mechanical planarization (ECMP) process.

In another aspect, the invention is directed to a method for removing metal ions from used slurries using an ion exchange resin. The used slurry is filtered to remove solids from liquids that contain metal ions. The liquids are treated with an ion exchange polymer to remove metal ions. The ion exchange polymer is separated from the slurry; and the ion exchange polymer is treated to remove the metal ions from an aqueous solution.

In a further aspect, the invention is directed towards a system comprising a slurry delivery system and a planarization tool which receives slurry from the slurry delivery system. A slurry treatment and recycle system receives used slurry with metal ions from the planarization tool, treats and recycles the slurry and removes metal from the treated slurry.

DETAILED DESCRIPTION OF THE EMBODIMENTS OF THE INVENTION

Figure 1:
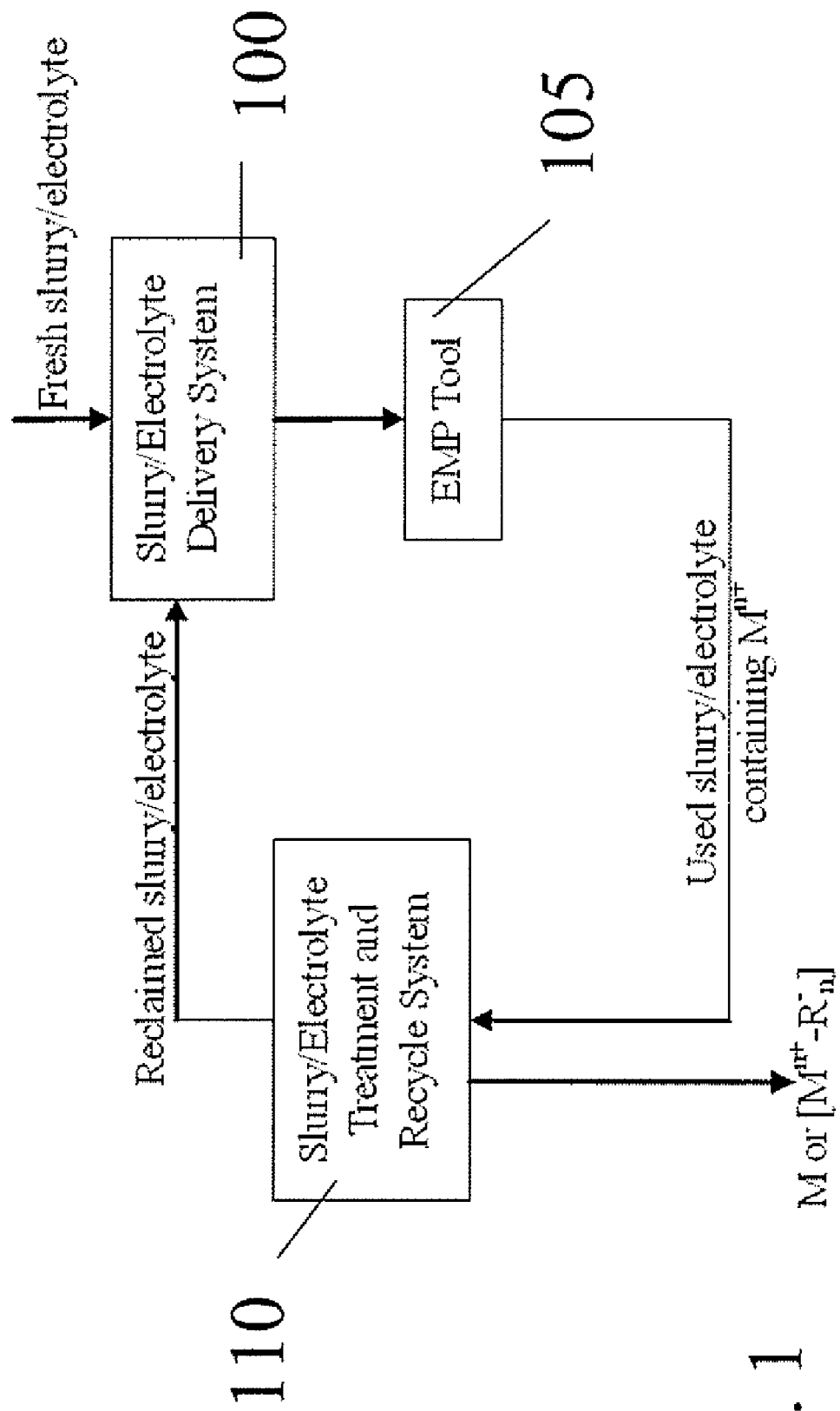
FIG. 1 shows an implementation in accordance with the invention.

The present invention relates to Electrochemical-Mechanical Planarization (ECMP) processing of semiconductor manufacture of wafers. In embodiments, the invention is configured to remove metal ions from used slurry in order to allow reuse of the slurry in subsequent ECMP processes. Ion exchange, solvent extraction, and/or electrochemical processes may accomplish the advantages of the invention. Thus to maintain the required standards of ECMP processes, the methods and system of the invention render a used slurry into a reusable slurry. In embodiments, the metal ions impurities are removed to improve the quality of the slurry, itself.

FIG. 1 shows a system implementing the processes of the invention. Fresh slurries used for the ECMP process are delivered to the ECMP tool for the removal of metal from the wafer. Generally, the type of metal used on the wafer is copper, but the invention is applicable to all types of metal conventionally used for semiconductor and wafer manufacture. More specifically, a slurry/electrolyte delivery system 100 contains fresh slurry for an electrochemical mechanical planarization (ECMP) process or alternatively, for a chemical mechanical planarization (CMP). The fresh slurry is delivered to an ECMP tool 105, which is configured for the processing of semiconductor wafers. During the processing of the semiconductor wafers, metal ions from the wafer are dissolved into the slurry either by electrochemical oxidation or through abrasion of metal particles followed by ambient oxidation in the slurry. In either scenario, the slurry becomes contaminated with metal ions during this processing.

Unlike conventional processes where used slurries are discarded, the present invention as shown further in FIG. 1 comprises a treatment and recycle system 110 which is configured and structured to treat and recycle the used slurry, i.e., extract metal ions from the used slurry. Upon treatment, the slurry may be fed back into the system, e.g., recycled. In embodiments, the metal ions separated from the used slurry can be recovered as solid metal by electrochemical reduction processes. In further processing, additives, fresh slurry and abrasive may be added to the slurry to maintain a desired concentration or formulation.

Still referring to FIG. 1, the treatment and recycle system 110 may comprise many different processes in order to extract the metal ions. By way of illustration, the treatment and recycle system 110 may implement solvent extraction and ionic exchange processes. More specifically, the treatment and recycle system 110 uses an ion exchange filter or an ion exchange resin. By way of example, a chemical solution such as an oil phase acidic solvent (H—R) or ionic exchange filter can be used to extract metal ions ($M^{n+}$) dissolved ion the used slurry.

The treated slurry electrolyte can be separated from the metal ion loaded solvent phase and reused. The metal ion loaded solvent can be treated with an acidic solution, for example, and then reused.

More specifically, using the ion exchange processes, in embodiments, the used slurry is filtered to remove solids such as abrasives. The metal ions are filtered through a column of ion exchange resin. Alternatively ion exchange resin can be added to the liquids for a certain amount of time to exchange the metal ions from the liquids. Furthermore, during the time when ion exchange resin is mixed with the liquids, the mixture can be agitated or stirred to accelerate the extraction of metal ions. In embodiments, any commercial ion exchange filter or resin for metal ion exchange can be used with the invention.

Prior to its use, the ion exchange resin may be prepared and loaded with the desired cations that exchange with the metal ions of the used slurry. For example, if the metal ions of the slurry are to be exchanged with protons, the ion exchange resin is prepared in an acidic workup to be loaded with protons. Besides the polymeric resin having cations for the exchange with metal ions, a resin can be used that has metal chelators attached to the polymeric backbones, such metal chelators being essential similar in structure to known metal chelators having at least one valency bound to the polymeric backbone.

As an alternate to the use of ion exchange filters or resin, another embodiment of the invention includes using a heterogeneous two phase system where the used slurry is one phase and a second non-aqueous-phase acidic solution serves as the extraction phase. In order to increase the affinity for metal ions, the non-aqueous phase can comprise lipophilic metal chelators, such as cyclic polyethylene compounds condensed to aromatic or nonpolar groups.

Furthermore, the two-phase extraction method can be extended to any solvent that is immiscible to the slurry and have affinity to metal ions. Such solvents may be, for example, benzyl alcohol, D2EHPA (di-2-ethylhexyl phosphoric acid), TBP (tri-butyl phosphate).

In embodiments, the two phases are mixed and agitated until the solvent contains the maximum concentration of metal ions according to the distribution coefficient of the two systems. Then, the liquids are separated and fresh solvent may be added to remove residual amounts of metal ions from the slurry. This process is repeated until the slurry is free of metal ions or has reached concentration below certain specified level. In embodiments, specified levels may be between 0 and 50 ppm, preferably between 0 and 30 ppm, and more preferably between 0 and 20 ppm are contemplated. For example, slurries with a metal ion concentration of less than 15 ppm are acceptable for use in ECMP processes.

The amount of metal ions present can be determined by conventional analytical methods, such as atom absorption or fluorescence spectroscopy and electrochemical analysis, such as potentiometric or galvanometric analysis.

In addition to the use of the above listed solvents, the solvents can be mixed with diluents. Preferably, these diluents are miscible with the solvent and not miscible with the slurry. In embodiments, ethers, such as dialkyl ether, for example diethyl ether, or aryl ethers, such as phenyl ethers; liquid alkanes, e.g., hexanes, can be used as diluents.

In yet another further embodiments, the metal ions $M^{n+}$ can be electrochemically deposited on a conductive cathode such as titanium.

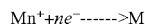

In this process, the metal ions are removed from the used slurry by using an external power source.

More specifically, the metal ions can be directly electrochemical reduced from the slurry. This is achieved by two inert electrodes, preferably made from inert metals such as titanium, platinum, palladium, silver, gold, or inert material such as carbon, which are immersed into the used slurry. The slurry may be filtered prior to the electrochemical process.

Upon applying the specific reducing potential, the metal ions are reduced to solid metal and deposited on the cathode. An advantage of this process is that the device that extracts the metal ions from the solution servers also as an analytical device to monitor completion of the extraction process. For example, a potentiometric measurement determines the metal ion concentration, which can be used to calculate the charges necessary to reduce all metal ions in the slurry. Next, using a galvanometric method, i.e. loading up the electrodes at the specific reduction potential and providing this potential over the calculate amount of charge, will give efficient extraction of the metal ions.

After removal or extraction of the metal ions from the used slurry, the slurry may be fed with additives to regain qualifications for further use in the ECMP or CMP process. Additives may be known abrasives such as, for example, fumed amorphous silica abrasive particles dispersed in $H_2O_2$, $Fe(NO_3)_3$, and glycine solutions.

After the slurry has been treated as described above, the metal ions can be extracted into an aqueous solution. The extraction medium can be reused for further slurry purification. Also, the aqueous solution of metal ions can be used for metal recovery.

In embodiments, the extraction medium is being mixed with an acidic aqueous solution and thoroughly washed to dissolve the metal ions into the aqueous phase. This washing may be repeated a number of times, e.g., 2 to 5 times. After the washing removes substantial all the metal ions from the extraction medium, the aqueous solutions are combined and prepared for metal recovery according to conventional methods.

Thus, the system and methods of the invention contains an ionic exchange resin or filter as an extraction medium or a chemical solution bath that is immiscible with the slurry. In other embodiments, the system may contain a filter system to remove the abrasives from the liquids for further processing of the metal ion containing liquid phase. Also, the system may include an electrochemical chamber for the recovery of solid metal by reduction on a conductive cathode.

The methods as described above are used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in terms of embodiments, those skilled in the art will recognize that the invention can be practiced with the modification within the spirit and scope of the appended claims. For example, the invention can be readily applicable to bulk substrates.

What is claimed is:

1. A method of reclaiming a slurry comprising contacting an electrochemical-mechanical planarization slurry with an immiscible, non-aqueous phase acidic solvent and extracting metal ions from the slurry into said immiscible solvent to form a treated slurry for further use in an electrochemical mechanical planarization (ECMP) process.

2. The method according to claim 1, wherein the extracting the metal ions further comprises using an ionic exchange resin.

3. The method according to claim 2, further comprising replenishing the treated slurry with fresh slurry to maintain at least one of metal ions, additives and abrasive levels at specified levels.

4. The method according to claim 2, further comprising replenishing the treated slurry with a component of fresh slurry to maintain at least one of metal ions, additives and abrasive levels at specified levels.

5. The method according to claim 1, further comprising centrifuging used slurry to remove particles from the used slurry.

6. The method according to claim 1, wherein the extracting metal ions comprises:
mixing used slurry with the immiscible solvent for metal ions to form two phases; and separating the two phases to extract the metal ions.

7. The method according to claim 6, wherein the extracting the metal ions further comprises electrochemically depositing the metal ions on a conductive cathode.

8. The method according to claim 6, further comprising replenishing the treated slurry with a component of fresh slurry to maintain at least one of the metal ions, additives and abrasive levels at specified levels.

9. The method according to claim 1, wherein the immiscible solvent comprises metal chelators.

10. The method according to claim 1, wherein the immiscible solvent comprises a diluent.

11. The method according to claim 1, further comprising treating the separated immiscible solvent with an aqueous acidic phase to remove the metal ions from the immiscible solvent phase into the aqueous acidic phase.

12. The method according to claim 1, wherein the extracting metal ions further comprises electrochemically depositing the metal ions on a conductive cathode.

13. The method according to claim 1, wherein the metal ions are separated from the slurry by an electrochemical reduction process.

14. The method according to claim 1, further comprising agitating or mixing the solvent and the immiscible solvent to accelerate the extraction of the metal ions.

15. The method according to claim 1, wherein used slurry and the immiscible solvent are a heterogeneous two phase system.

16. The method according to claim 15, wherein the two phases are mixed until the metal ion concentration in said slurry is below 50 ppm.

17. The method according to claim 15, wherein the two phases are mixed until the metal ion concentration in said slurry is less than 15 ppm.

18. The method according to claim 1, wherein the immiscible solvent is one of di-2-ethylhexyl phosphoric acid, benzyl alcohol and tri-butyl phosphate.

* * * * *